(12) United States Patent
Katsuma et al.

(10) Patent No.: US 8,038,563 B2
(45) Date of Patent: Oct. 18, 2011

(54) INDEX TABLE

(75) Inventors: Toshifumi Katsuma, Ritto (JP); Michiaki Hashitani, Ritto (JP); Koichi Masuo, Ritto (JP); Takayoshi Hirayama, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 782 days.

(21) Appl. No.: 12/071,239

(22) Filed: Feb. 19, 2008

(65) Prior Publication Data

US 2008/0220922 A1   Sep. 11, 2008

(30) Foreign Application Priority Data

Mar. 6, 2007   (JP) ................. 2007-055105

(51) Int. Cl.
F16H 13/06 (2006.01)
F16H 15/48 (2006.01)
F16H 13/14 (2006.01)

(52) U.S. Cl. .............. 475/183; 475/194; 475/195

(58) Field of Classification Search ............ 475/31, 475/183–197
See application file for complete search history.

(56) References Cited

U.S. PATENT DOCUMENTS

| 2,344,432 | A | * | 3/1944 | Wahlmark | 409/156 |
| 5,203,748 | A | * | 4/1993 | Sawada et al. | 475/183 |
| 6,344,009 | B1 | * | 2/2002 | Wirz | 475/185 |

FOREIGN PATENT DOCUMENTS

| DE | 19620449 A1 | 11/1997 |
| DE | 19842306 A1 | 3/2000 |
| EP | 0288660 A2 | 11/1988 |
| JP | 62171559 A | * | 7/1987 |
| JP | 01087137 A | * | 3/1989 |
| JP | 2003-011021 A | 1/2003 |
| JP | 2003-025147 A | 1/2003 |
| JP | 2003-159634 A | 6/2003 |
| JP | 2005-111600 A | 4/2005 |
| JP | 2006349046 A | * | 12/2006 |

OTHER PUBLICATIONS

Hashitani et al.,"ZE15A Gear Grinding Machine for economical hard gear finishing of quiet, small gears", Mitsubishi Heavy Industries, Ltd., Technical Review vol. 42 No. 2, (Apr. 2005).

* cited by examiner

*Primary Examiner* — Tisha Lewis
(74) *Attorney, Agent, or Firm* — Birch, Stewart, Kolasch & Birch, LLP

(57) ABSTRACT

The index table includes a rotary table for setting a workpiece for a machine tool; a rotary table shaft fixedly provided on the rotary table; a driving motor mechanism, which is a driving source; and a planetary roller speed-reduction mechanism having a sun roller, which is a motor output shaft of the driving motor mechanism, a ring fixed to the speed-reduction mechanism, a plurality of planetary rollers arranged at equal angular intervals between the sun roller and the ring in a pressurized state, and a planetary roller harness that fixedly supports a plurality of planetary roller shafts pivotally supporting the planetary rollers in a rotatable manner and is fixedly provided coaxially with the rotary table shaft.

11 Claims, 2 Drawing Sheets

INDEX TABLE

BACKGROUND OF THE INVENTION

1. Field of the Invention

The present invention relates to an index table for a machine tool and, more particularly, to a construction of an index table for indexing the angular position of a workpiece, which index table is suitable for gear cutting and grinding.

2. Description of the Related Art

In a conventional gear grinding device, a gear to be machined, which is a workpiece, is set on a rotary index table, which is capable of being moved vertically, by using a collet chuck, the rotary index table is rotationally driven by a servomotor via a gear reducer means, and the rotational speed and the rotational angular position of the index table are detected by an encoder attached concentrically to the index table, the detected values being sent to a control unit and feedback controlled so as to match the preset values of the rotational speed and the rotational angular position of gear grinding.

A problem with the rotary index table having such a gear reducer means is that since power is transmitted via several gears, the table rotation has an angular position error due to backlash between the gears, which degrades the accuracy of the gear to be machined.

To solve this problem, the driving means for the conventional index table described in Japanese Unexamined Patent Application Publication No. 2003-159634 (FIG. 1) uses a planetary roller speed-reduction mechanism including a plurality of stages of backlash-less planetary rollers in place of the gear reducer means to obtain a predetermined speed reduction ratio.

Also, the index table of conventional example described in Japanese Unexamined Patent Application Publication No. 2003-25147 (FIG. 3) has a backlash-less configuration in which a driving motor is housed in a housing that supports the index table, and the output shaft of the motor is connected directly to the table on which the workpiece is set.

The conventional example described in Japanese Unexamined Patent Application Publication No. 2003-159634 has an advantage that a power transmitting means scarcely has backlash. In this conventional example, however, since a coupling is interposed between a motor and the planetary roller speed-reduction mechanism, many connecting parts such as the output shaft of motor, the coupling, and the planetary roller speed-reduction mechanism are present, so that a power transmitting part lengthens. Therefore, the rigidity decreases as a whole, and therefore an adverse influence may be exerted on the rotation accuracy.

Also, in the conventional example described in Japanese Unexamined Patent Application Publication No. 2003-25147, a power transmitting means has no backlash and has no problem with the rigidity as in the above-described case. However, since the motor connected directly to the table requires high rotation torque at a low speed, so that the size of device inevitably increases, and therefore the sizes of the housing and peripheral functional parts also increase, which presents a problem of high cost.

SUMMARY OF THE INVENTION

Accordingly, the object of the present invention is to provide a built-in type index table in which a power transmitting means scarcely has backlash and, at the same time, the space and cost can be saved.

The present invention solves the above-described problems by the means described below.

(1) A first means provides an index table including a rotary table for setting a workpiece for a machine tool;

a rotary table shaft fixedly provided on the rotary table;

a driving motor mechanism, which is a driving source; and a planetary roller speed-reduction mechanism having a sun roller, which is a motor output shaft of the driving motor mechanism, a ring fixed to the speed-reduction mechanism housing, a plurality of planetary rollers arranged at equal angular intervals between the sun roller and the ring in a pressurized state, and a planetary roller harness that fixedly supports a plurality of planetary roller shafts pivotally supporting the planetary rollers in a rotatable manner and is fixedly provided coaxially with the rotary table shaft.

(2) A second means provides an index table, wherein in the index table of the first means, a motor of the driving motor mechanism is a servomotor;

an encoder capable of detecting the rotation angle of the rotary table is provided to feed back the detected values of rotation speed and angular position of the rotary table to a control circuit; and control can be carried out so that the rotation speed and angular position of the rotary table take preset values.

(3) A third means provides an index table, wherein in the index table of the first or second means, a bearing interposed between the planetary roller and the planetary roller shaft is an angular contact bearing pressurizing in the axial direction.

(4) A fourth means provides an index table, wherein in the index table of any one of the first to third means, the index table is provided with:

a rotating shaft center hole formed in the shaft centers of the rotary table shaft, the driving motor mechanism, and the planetary roller harness; and a fluid pressure pipe that is disposed in the rotating shaft center hole and is connected to a fluid-operated actuator incorporated in the rotary table.

(5) A fifth means provides an index table, wherein in the index table of the fourth means, a rotary joint for a working fluid is connected to the outside on the driving motor mechanism side of the fluid pressure pipe.

The inventions of claims 1 and 2 are the index tables of the first and second means, the motor output shaft of the driving motor mechanism is used as the sun roller, and the planetary roller harness is connected directly to the rotary table shaft of the rotary table on which a workpiece is set. Therefore, the whole of device is small in size and low in cost. Also, functional parts and connecting parts thereof have no backlash, and the rotation angle of index table is detected precisely and is feedback controlled so as to match the preset value. Therefore, an effect that the accuracy of rotational angular position of table is improved is achieved.

The invention of claim 3 is the index table of the third means, and the engagement between the planetary roller, the planetary roller shaft, and the bearing is firm. Therefore, an effect that the accuracy of rotational driving is further improved is achieved.

Also, the inventions of claims 4 and 5 are the index tables of the fourth and fifth means, and the pipe leading to the fluid-operated actuator capable of operating a clamp for setting and removing the workpiece is allowed to pass through the rotating shaft center hole in the shaft center of the index table and is pulled out to a position distant from the rotary table. Therefore, the size of the rotary joint is small, and the pipe is easy to assemble, so that an effect of reducing cost is achieved.

DETAILED DESCRIPTION OF THE PREFERRED EMBODIMENTS

A configuration of an index table in accordance with an embodiment of the present invention will now be described with reference to the accompanying drawings.

Figure 1:
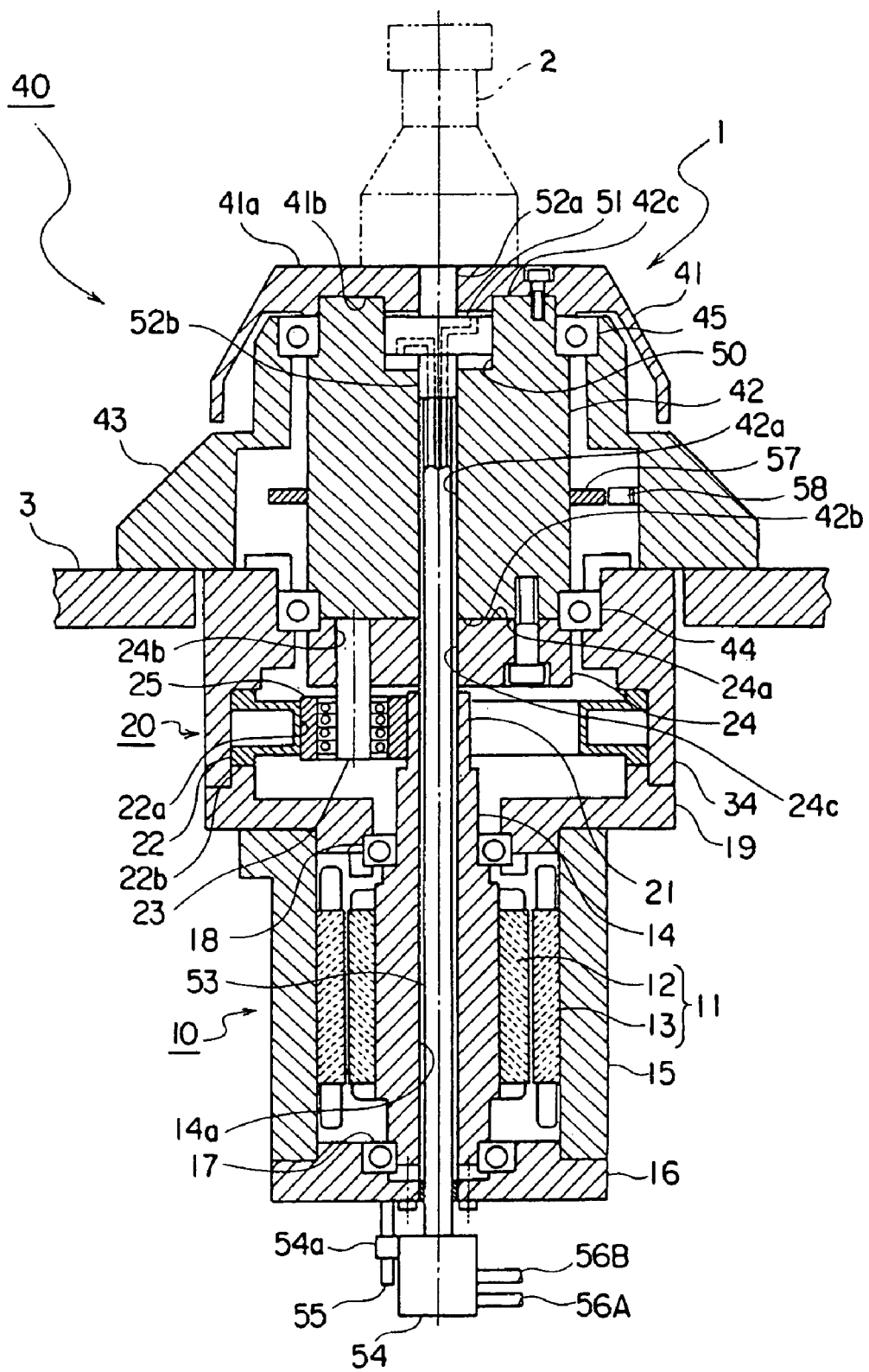
FIG. 1 is a side sectional view of an index table in accordance with an embodiment of the present invention.
Figure 2:
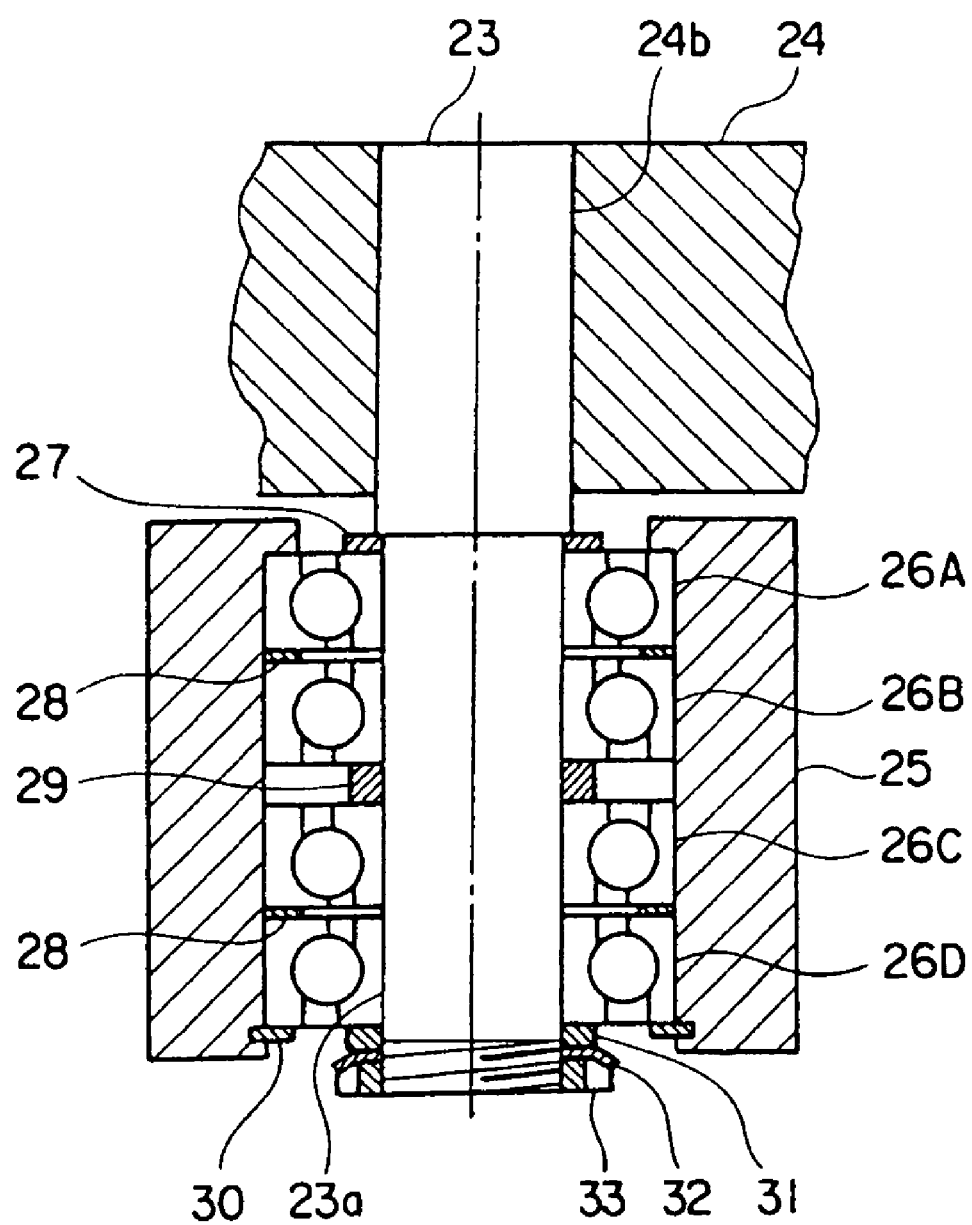
FIG. 2 is a sectional view showing a detailed construction of a planetary roller in the index table shown in FIG. 1.

FIG. 1 is a side sectional view of the index table in accordance with the embodiment of the present invention, and FIG. 2 is a sectional view showing a detailed construction of a planetary roller in the index table shown in FIG. 1.

As shown in FIG. 1, an index table 1 includes a rotary table 41 having a workpiece setting surface 41a on which a workpiece 2 for a machine tool is set, a rotary table mechanism 40 including a rotary table shaft 42, which is fixedly provided on the rotary table 41, or the like, a planetary roller speed-reduction mechanism 20 provided under the rotary table mechanism 40, a driving motor mechanism 10, which is a driving source, provided under the planetary roller speed-reduction mechanism 20, an encoder, and a clamp mechanism working fluid system.

The rotary table mechanism 40, the planetary roller speed-reduction mechanism 20, and the driving motor mechanism 10 are integrated coaxially.

(Rotary Table Mechanism)

The rotary table mechanism 40 includes the rotary table 41, the rotary table shaft 42, and a table shaft housing 43.

The rotary table 41 is attached to the rotary table shaft 42 so that a back surface 41b of the table comes into contact with an upper surface 42c of the rotary table shaft 42.

The table shaft housing 43 and a speed-reduction mechanism housing 34, described later, are combined with each other integrally in a concentric manner. The table shaft housing 43 and the speed-reduction mechanism housing 34 incorporate bearings 44 and 45, respectively, so that the rotary table shaft 42 is rotatably supported by the bearings 44 and 45 in such a manner that the axial movement thereof is restricted.

The index table 1 is attached to an external member 3 via the table shaft housing 43.

In the shaft center of the rotary table shaft 42, a rotating shaft center hole 42a that allows hydraulic pipes 53, described later, to pass through is formed in the axial direction.

(Planetary Roller Speed-Reduction Mechanism)

The planetary roller speed-reduction mechanism 20 includes the speed-reduction mechanism housing 34, a sun roller 21, which is an output shaft 14 of a servomotor 11 of the driving motor mechanism 10, described later, a ring 22 fixed to the speed-reduction mechanism housing 34, a plurality of planetary rollers 25 arranged at equal angular intervals between the ring 22 and the sun roller 21, and a planetary roller harness 24 (carrier) that pivotally supports the planetary rollers 25 by means of a plurality of planetary roller shafts 23.

An inside cylindrical part of the planetary roller speed-reduction mechanism housing 34 accommodates the ring 22.

Also, under the planetary roller speed-reduction mechanism housing 34, an intermediate housing lid 19 is disposed integrally.

Further, in a lower part of the intermediate housing lid 19, a bearing 18 on the driving motor mechanism 10 side is supported.

The ring 22 has an elastic ring shape such that when the ring 22 is pushed from a ring side surface 22b at the outer periphery, the diameter of the inner surface of a ring inside diameter part 22a decreases.

The planetary roller harness 24 is attached to the rotary table shaft 42 so that an upper surface 24a thereof comes into contact with a lower surface 42b of the rotary table shaft 42.

In the shaft center of the planetary roller harness 24, a rotating shaft center hole 24c that allows the hydraulic pipes 53, described later, to pass through is formed in the axial direction.

In a plurality of harness hollow holes 24b arranged at equal angular intervals in the planetary roller harness 24, the planetary roller shafts 23 are fixedly provided.

In a tip end part 23a of the planetary roller shaft 23, as shown in FIG. 2, the planetary roller 25 is provided via angular contact bearings (hereinafter referred simply to as bearings) 26A, 26B, 26C and 26D.

The bearings interposed between the planetary roller 25 and the tip end part 23a thereof are the bearings 26A, 26B, 26C and 26D in which balls are pressurized.

The four bearings 26A, 26B, 26C and 26D provided in the axial direction of the planetary roller shaft 23 are configured so as to be pressurized by an axial force caused by a plurality of stages of washers 27 to 31, a star nut 33 threadedly engaged with the shaft end of the tip end part 23a of the planetary roller shaft 23, and a star washer 32.

The force applied to the uppermost washer 27 pushes the side surface of the inner race of the bearing 26A. The force is transmitted to the outer race of the bearing 26a via the ball, and is transmitted from the outer race of the bearing 26A to the outer race of the bearing 26B through the washer 28.

The force applied to the outer race of the bearing 26B is transmitted to the inner race of the bearing 26B via the ball, and is transmitted to the inner race of the bearing 26C through the washer 29.

The force transmitted to the inner race of the bearing 26C is transmitted to the outer race of the bearing 26C via the ball, and is transmitted to the outer race of the bearing 26D through the washer 28.

The force transmitted to the outer race of the bearing 26D is transmitted to the inner race of the bearing 26D and the lowermost washer 31 in the tip end part 23a of the planetary roller shaft 23 via the ball.

Under the outer race of the bearing 26D, there is provided the washer 30 for preventing the bearings from dropping.

The star nut 33 is threadedly engaged with the threads at the tip end of the tip end part 23a of the planetary roller shaft 23, so that the force transmitted through the angular contact bearings 26A, 26B, 26C and 26D is supported by the star nut 33 via the washer 31 and the star washer 32.

At the time of assembly, the rotation angle of the star nut 33 is adjusted to regulate the pressurization force.

After the rotation angle of the star nut 33 has been determined, one of star protrusions of the star washer 32 the rotation direction of which is restricted with respect to the tip end part 23a of the planetary roller shaft 23 is bent, by which the rotation direction of the star nut 33 is restricted.

(Driving Motor Mechanism)

As shown in FIG. 1, the driving motor mechanism 10 includes a motor housing 15, a motor housing cover 16, the intermediate housing lid 19, and the servomotor 11 (or may be an induction motor the rotation of which is controlled by an inverter or a synchronous motor) including a rotor 12 and a stator 13.

On the inside of the motor housing 15, the stator 13 of the servomotor 11 is fixed.

Also, on the motor housing cover 16 and the intermediate housing lid 19, bearings 17 and 18 are incorporated, respectively, so that the motor output shaft 14 integral with the rotor 12 is rotatably supported by the bearings 17 and 18 in such a manner that the axial movement thereof is restricted.

In the shaft center of the motor output shaft 14, a rotating shaft center hole 14a that allows the hydraulic pipes 53, described later, to pass through is formed in the axial direction.

(Encoder)

At the outer periphery of the rotary table shaft 42, an encoder drum 57 is fixedly provided to detect the rotation angle.

On the other hand, on the inner wall of the table shaft housing 43, an encoder head 58 is fixedly provided at a position facing to the encoder drum 57 to precisely detect the rotation angle of the rotary table 41, that is, the rotary table shaft 42.

The detected values of the rotation speed and angular position of the rotary table 41 detected by the encoder head 58 are fed back to a control circuit, not shown, by which control is carried out so that the rotation speed and angular position of the rotary table 41 take preset values.

(Clamp Mechanism Working Fluid System)

Next, the clamp mechanism working fluid system is explained.

In the upper part in the center of the rotary table shaft 42, a hole is provided to form a cylinder 50. This cylinder 50 and the lower part of the rotary table 41 define a cylinder chamber.

In the cylinder 50, a piston 51 capable of being moved in the axial direction is provided.

The piston 51 has an upper piston rod 52a and a lower piston rod 52b. The upper piston rod 52a is connected to a clamp mechanism, not shown, for holding the workpiece 2. In the piston 51 and the lower piston rod 52b, two fluid passages communicating with oil chambers above and below the piston 51 are formed.

In the shaft center of the rotary table shaft 42, the planetary roller harness 24, and the motor output shaft 14, the rotating shaft center holes 42a, 24c and 14a are formed, respectively, as described above.

The inside diameters of these rotating shaft center holes 42a, 24c and 14a are equal, and one axial shaft center through hole is formed by the rotating shaft center holes 42a, 24c and 14a to allow the two hydraulic pipes 53 to pass through.

The upper ends of the two hydraulic pipes 53 are fixed to the lower surface of the lower piston rod 52b under the piston 51 by threaded engagement, press fitting, soldering, or bonding.

The lower parts of the hydraulic pipes 53 project to the outside through the motor housing cover 16 of the driving motor mechanism 10.

To the lower ends of the projecting hydraulic pipes 53, a rotary joint 54 is connected.

The rotary joint 54 moves together with the hydraulic pipes 53 in association with the vertical operation of the piston 51. Therefore, a protrusion 54a is provided on the side surface of the rotary joint 54, and is engaged with a stopper pin 55 fixedly provided on the motor housing cover 16 to prevent the rotary joint 54 from turning.

Pipes 56A and 56B connected to the rotary joint 54 are connected to selector valves, not shown, through flexible pipes, not shown, so that changeover is accomplished from the working fluid side to the discharge tank side and vice versa in the selector valves.

By the operation (vertical movement) of the piston 51 performed by the working fluid, the clamp mechanism for setting and removing the workpiece 2 can be operated.

The above is an explanation of one embodiment of the present invention. The present invention is not limited to the above-described embodiment, and, needless to say, the specific construction may be changed variously within the scope of the present invention.

For example, the hydraulic actuator including the cylinder 50, the piston 51, the upper piston rod 52a, and the lower piston rod 52b can be replaced with a fluid-operated actuator such as a pneumatic actuator.

Also, the hydraulic pipes 53 (or the fluid pressure pipes) is not limited to the above-described pipe having two through holes, and may be a double pipe.

In this case, the two fluid passages communicating with the upper oil chamber (or fluid pressure chamber) and the lower oil chamber (or fluid pressure chamber) turn to a double hydraulic passage (or a double fluid passage) from an intermediate portion.

What is claimed is:

1. An index table comprising:
    a rotary table for setting a workpiece for a machine tool;
    a rotary table shaft fixedly provided on the rotary table;
    a driving motor mechanism, which is a driving source; and
    a planetary roller speed-reduction mechanism including a sun roller, a ring fixed to the speed-reduction mechanism housing, a plurality of planetary rollers arranged at equal angular intervals between the sun roller and the ring in a pressurized state, and a planetary roller harness that fixedly supports a plurality of planetary roller shafts pivotally supporting the planetary rollers in a rotatable manner and is fixedly provided coaxially with the rotary table shaft, wherein a motor output shaft of the driving motor mechanism is used as the sun roller, wherein
    the index table is provided with:
    a rotating shaft center hole formed in the shaft centers of the rotary table shaft, the driving motor mechanism, and the planetary roller harness; and
    a fluid pressure pipe that is disposed in the rotating shaft center hole and is connected to a fluid-operated actuator incorporated in the rotary table.

2. An index table according to claim 1, wherein
    a motor of the driving motor mechanism is a servomotor;
    an encoder capable of detecting the rotation angle of the rotary table is provided to feed back the detected values of rotation speed and angular position of the rotary table to a control circuit; and
    control can be carried out so that the rotation speed and angular position of the rotary table take preset values.

3. An index table according to claim 1, wherein
    a bearing interposed between the planetary roller and the planetary roller shaft is an angular contact bearing pressurizing in the axial direction.

4. An index table according to claim 2, wherein
    a bearing interposed between the planetary roller and the planetary roller shaft is an angular contact bearing pressurizing in the axial direction.

5. An index table according to claim 2, wherein
    the index table is provided with:

a rotating shaft center hole formed in the shaft centers of the rotary table shaft, the driving motor mechanism, and the planetary roller harness; and a fluid pressure pipe that is disposed in the rotating shaft center hole and is connected to a fluid-operated actuator incorporated in the rotary table.

6. An index table according to claim 3, wherein the index table is provided with:

a rotating shall center hole formed in the shall centers of the rotary table shaft, the driving motor mechanism, and the planetary roller harness; and a fluid pressure pipe that is disposed in the rotating shall center hole and is connected to a fluid-operated actuator incorporated in the rotary table.

7. An index table according to claim 4, wherein the index table is provided with:

a rotating shaft center hole formed in the shaft centers of the rotary table shaft, the driving motor mechanism, and the planetary roller harness; and a fluid pressure pipe that is disposed in the rotating shaft center hole and is connected to a fluid-operated actuator incorporated in the rotary table.

8. An index table according to claim 1, wherein a rotary joint for a working fluid is connected to the outside on the driving motor mechanism side of the fluid pressure pipe.

9. An index table according to claim 5, wherein a rotary joint for a working fluid is connected to the outside on the driving motor mechanism side of the fluid pressure pipe.

10. An index table according to claim 6, wherein a rotary joint for a working fluid is connected to the outside on the driving motor mechanism side of the fluid pressure pipe.

11. An index table according to claim 7, wherein a rotary joint for a working fluid is connected to the outside on the driving motor mechanism side of the fluid pressure pipe.

* * * * *